United States Patent
Pham et al.

(10) Patent No.: US 12,326,888 B2
(45) Date of Patent: Jun. 10, 2025

(54) AUTOMATED INTERACTIVE CONTENT EQUIVALENCE

(71) Applicant: Truist Bank, Charlotte, NC (US)

(72) Inventors: Phu Pham, Lawrenceville, GA (US); Jun Ji, Glen Allen, VA (US); Merle Hidinger, Midlothian, VA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/321,943

(22) Filed: May 23, 2023

(65) Prior Publication Data

US 2024/0394290 A1    Nov. 28, 2024

(51) Int. Cl.
*G06F 16/3332* (2025.01)
*G06F 16/35* (2025.01)

(52) U.S. Cl.
CPC .......... *G06F 16/3334* (2019.01); *G06F 16/35* (2019.01)

(58) Field of Classification Search
CPC ............................. G06F 16/35; G06F 16/3334
See application file for complete search history.

(56) References Cited

U.S. PATENT DOCUMENTS

| | | | |
|---|---|---|---|
| 11,706,337 B1 | 7/2023 | Mitchem | |
| 2003/0014448 A1* | 1/2003 | Castellanos | G06F 40/247 715/234 |
| 2005/0010461 A1* | 1/2005 | Manos | G06Q 10/10 705/7.12 |
| 2007/0133759 A1 | 6/2007 | Malik | |
| 2008/0091423 A1* | 4/2008 | Roy | G10L 15/26 704/235 |
| 2008/0104165 A1* | 5/2008 | Lo | H04L 41/0806 709/222 |
| 2012/0130771 A1* | 5/2012 | Kannan | G06Q 30/0203 707/738 |
| 2013/0117267 A1* | 5/2013 | Buryak | G06F 16/93 707/737 |
| 2017/0116584 A1 | 4/2017 | Lacoss-Arnold | |
| 2019/0244059 A1* | 8/2019 | Kolouri | G06F 18/41 |
| 2020/0034722 A1* | 1/2020 | Oh | G06N 3/084 |
| 2020/0410450 A1* | 12/2020 | Malhotra | G06F 40/284 |
| 2023/0011434 A1 | 1/2023 | Werdell | |
| 2023/0353516 A1 | 11/2023 | Banerjee | |

FOREIGN PATENT DOCUMENTS

WO    WO-2015023546 A1 *  2/2015   .......... G06F 17/2785

* cited by examiner

*Primary Examiner* — William Spieler
(74) *Attorney, Agent, or Firm* — Michael A. Springs, Esq.; Shumaker, Loop & Kendrick, LLP; Patrick B. Horne

(57) ABSTRACT

Disclosed are systems and methods that automate the process of analyzing interactive content data using artificial intelligence and natural language processing technology. The interactive content data is converted to machine encoded communication elements that can be further grouped into machined encoded n-grams. The co-occurrence of machine encoded communication elements or n-grams in the interactive content data is compared against communication elements or n-grams in a seed set of concentrated content files to determine an equivalence value. In this manner, the system can automate the process of determining the equivalence of interactive content data files.

14 Claims, 7 Drawing Sheets

AUTOMATED INTERACTIVE CONTENT EQUIVALENCE

TECHNICAL FIELD AND BACKGROUND

The present invention relates generally to the field of processing of interactive content data generated during an interaction between a user and a provider. More particularly, the invention relates to systems and methods that automatically detect and quantify equivalence in interactive content data generated during user-provider interactions through the use of artificial intelligence and natural language processing technology.

Conventional techniques for categorizing interactive content data generated during a user-provider interaction, or "shared experience," include manually selecting from among a discrete set of descriptors intended to characterize the interaction, or alternatively, manually reviewing and summarizing interactive content generated during the interaction. To detect and measure equivalence between shared experiences typically requires manual review of interactive content data. Conventional analysis techniques are time and labor intensive and suffer from reduced accuracy as a result of the subjective nature of the analysis or the limited, discrete selection of descriptors that are available to characterize the interactive content data.

It is, therefore, an object of the present invention to provide systems and methods that automate the process of determining equivalence between user-provider interactions by converting the interactions to an alphanumeric content data format and using artificial intelligence and natural language processing ("NPL") technology to detect equivalence in the communication elements that comprise the interactive content data and/or to detect similarities in the subjects addressed during the interaction or attributes of the interactive content data. The system automatically and efficiently processes ingested interactive content data and detects equivalence to a pre-selected, curated seed set of interactive content data. The results of the analysis in turn allow for identification of system and service problems and the implementation of system enhancements.

SUMMARY

According to one embodiment, a system for processing interactive content data generated during a shared experience includes a computing device having one or more integrated software applications that perform operations to implement the present systems and methods. Content data files can be alphanumeric text transcriptions of audio discussions between a user and a provider agent or virtual agent or records of written communication between a user and a provider (e.g., emails, SMS text messages, instant chat messages, or messages sent over a social media platform). The content data files include machine encoded communication elements (also referred to as "communication elements") which can be words, phrases, symbols (e.g., an emoji, logo, etc.), numbers, or other elements of that make up a written or transcribed communication. The content data files can incorporate a variety of other types of content metadata described in detail below.

The system activates a digital recorder that captures interactive communications and stores the interactive communications to a memory device as an interactive content file. The interactive content file is converted to a plurality of machine encoded n-grams. The co-occurrence of n-grams is measured as between the interactive content file and a seed set of concentrated interactive content files. The co-occurrence is converted to an equivalence value. When the equivalence value is above a predetermined equivalence value threshold, the interactive content file is stored to a positive match database. In one example embodiment, the equivalence value is determined using neural networking technology.

The seed set of interactive content files is a reference set of content data files that represent shared experience experiences between a provider and an end user. The reference set is selected by the provider as being representative of particular topics or attributes that the provider wants to detect in a larger corpus of content data. Thus, the provider selects shared experiences that are representative of further shared experiences that are to be identified and stored for further analysis. This allows a provider to efficiently and expediently identify trends and possible problems for resolution.

The seed set of interactive content files is concentrated in that particular communication elements such as words or sentences of relatively less importance are removed. Concentrating the interactive content data files enhances accuracy of subsequent analyses. The importance of communication elements can be determined by analyzing the frequencies of particular communication elements. Concentrating the interactive content files includes the steps of converting a seed set of interactive content files into vector form according to weighted frequency occurrence of machine encoded communication elements within the seed set of interactive content files. Then the system extracts machine encoded communication elements from the seed set of interactive content files according to a composite weighted frequency occurrence. The system then stores the seed set of interactive content files as the seed set of concentrated interactive content files following the extraction.

In other embodiments, more general frequency techniques are used that do not rely on summing weighted frequencies of communication elements. That is, the system measures a frequency of communication elements within a seed set of interactive content files. Then the system extracts communication elements from the seed set of interactive content files when the communication element frequency is below a frequency threshold. Finally, the system stores the seed set of interactive content files as the seed set of concentrated interactive content files following the extraction.

In one embodiment, the system is configured to detect when a certain proportion of interactive content files relating to a particular subject are detected. For example, if end users experience a problem with the provider system that are the subject of support requests, the problem can be detected as the proportion incoming support requests relating to the problem arise.

To generate the seed set of interactive content files, the system can first run a search on a production set of interactive content files to create an interactive content file subset. The production set can be interactive data from actual shared experiences processed by a provider. Each interactive content file within the subset is concentrated to extract communication elements of relatively reduced importance or frequency. The system can also generate a subject identification for one or more of the interactive content files within the subset, and select interactive content files within the subset having a subject identification that corresponds to a seed set subject identification. In this manner, the system is used to select seed interactive content files that relate to the topic that the provider is attempting to detect.

In one example embodiment, the system utilizes a neural network to generate the subject identifications. The neural network performs operations that implement K-means clustering to determine the subject identification, or alternatively, the neural network performs operations that implement Latent Dirichlet Allocation to determine the subject identification.

In other embodiments, the system can use other software processing techniques to determine the equivalence of two interactive content files. For instance, the system can determine various attributes of the interactive content data file that are compared against the seed set. Attributes are determined, for example, by segmenting the interactive content files according to the person speaking (i.e., a content source) or according to length of a given segment. A subject classification analysis can be used to determine subject identifications that are compared across interactive content data files. The various attributes include subject identifications and segment lengths can be formatted as a feature vector. Feature vectors for interactive content files are compared against feature vectors generated for the seed set of concentrated interactive content files to determine an equivalence value.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
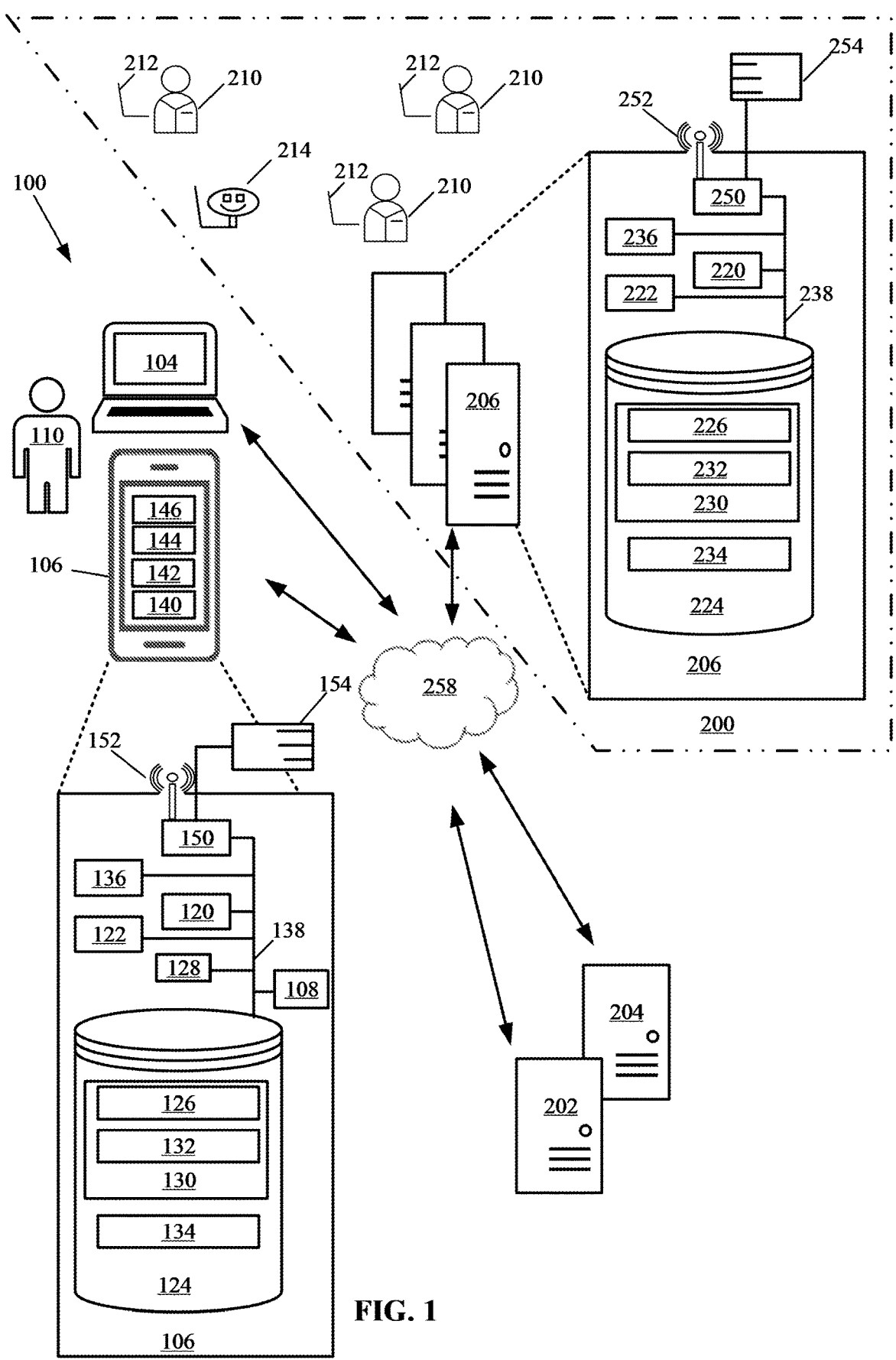
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. Interactions between a provider and its customers or users, can be referred to as a "shared experience." Shared experiences result in the generation of interactive content data through the exchange of verbal or written communications and expressions of ideas that are converted to, and stored as, interactive content data files. Shared experiences can include, for example, sales calls or a provider rendering customer support services to a customer, such as technical support.

The term "customer support" is used interchangeably with the terms support services, support, support requests, customer service, customer interactions, helpdesk requests, or a shared experience. Customer support generally includes, but is not limited to, providing customers with assistance in utilizing existing products and services and with purchasing additional products and services. The term "agent" generally describes an individual who interfaces with the customer to provide services using the systems and methods described herein, and the term is used interchangeably with the terms associate or representative.

The term "user" is used interchangeably with the terms end user, customer or consumer and represents individuals to whom a provider is rendering goods or services or individuals, with whom the provider has an ongoing relationship, and who contact a provider by telephone, video chat, email, text, or an instant message software application to request assistance with provider products and services. The term "participants" is used interchangeably with the term "content sources" and refers to humans or automated software technology (e.g., a chat bot) that generate linguistic expressions of ideas that can be processed using artificial intelligence and natural language processing technologies. For instance, content sources can include an agent and a customer or end user generating interactive content data as part of a shared experience.

The term "content" is used to generally refer to alphanumeric text in digital form and can be used interchangeably with the terms alphanumeric content data, alphanumeric text content, alphanumeric textual content data, content data, interactive content data, textual content data, textual data, and text content data. These terms for content can be used interchangeably with the term "transcript data" where the terms are being used to refer to a written digital record, in text form, of a single speaker or a written or verbal interaction between multiple participants in a conversation or discussion. Content can be generated by transcribing an oral interaction during a shared experience by telephone or video conference, or generated during written exchanges by email, instant "chat" messaging, short message service ("SMS"), or messages exchanged through various online platforms or social media software applications.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods for automatically processing alphanumeric content data by reducing, classifying, and segmenting alphanumeric text content using artificial intelligence and natural language processing technology. The example embodiments discussed herein are generally described with reference to interactive content data generated from a transcript of a written or verbal interactive exchange between conversation participants or "content sources." The content data is interactive in that the data is generated from an interaction between two content data sources, such as a provider agent and end user. Examples of interactive content data include, but are not limited to, an exchange of instant chat messages between two or more participants or recorded audio data generated during a telephone call (e.g., a consumer support request or help desk call), or a video conference. Those of skill in the art will appreciate that the example embodiments are not intended to be limiting, and the systems and methods can be applied to other types of alphanumeric content data.

The interactive content data is analyzed using natural language processing techniques that are implemented by artificial intelligence technology. The resulting outputs can include, without limitation: (i) the identities of conversation participants or "content sources;" (ii) a list of subjects addressed within the content data and that can include the reasons or "driver" for why a customer initiated a shared experience; (iii) weighting data showing the relative importance or engagement associated with certain subjects; (iv) frequency data defining the proportion of shared experiences that relate to a particular subject identification or driver for a support request; and (v) a equivalence value indicating a degree of similarity in subjects between two shared experiences.

The embodiments discussed in this specification are described with reference to systems and methods utilized in a call center environment where provider personnel are engaging in shared experiences and performing customer service activities. However, those of ordinary skill in the art will appreciate that the disclosed systems and methods are not limited to use in a call center environment or use in performing customer service activities. Rather, the systems and methods are generally applicable in other contexts where system end users seek to analyze large volumes of interactive content data to identify particular subjects or drivers of the interaction.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 & 106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Capturing Interactive Content Data and Content Metadata

The provider system can be configured to generate interactive content data manually or to obtain interactive content data from a third party source, such as a cloud storage service or remote database. To generate interactive content data manually, a provider agent utilizes a computing device to accesses a remote third party system to download audio data or alphanumeric text data representing written communications between a user and a provider agent or a transcription of an oral discussion.

A provider agent accesses the third party system using a software application compatible with the third party system that can be integrated with the agent computing device, such as an integrated mobile software application or an application programmable interface ("API") software application that facilitates communication between software and systems by mapping computer-readable commands and data formats between systems. In another embodiment, the agent computing device accesses the third party system using an Internet browser software application to access a web-based software interface.

Provider-user interactions generally commence when a user initiates contact with a provider by telephone or written electronic communication (e.g., email, SMS text message, an instant chat message, or a social media message). The interactive content data can take the form of written electronic communications, or interactive content data can be generated by recording and transcribing telephonic communications between a user and a provider system or agent. Captured audio data is stored to the provider system and transcribed into alphanumeric text data using a speech-to-text software application and stored as interactive content data files comprising interactive content data. In some embodiments, the speech-to-text conversion is performed by a third party, and the provider system downloads and stores the interactive content data directly from the remote third party source.

The interactive content data can be stored directly to a provider system or stored to a third party database, such as a cloud service storage or software as a service provider. The interactive content data is stored to a relational database that maintains the interactive content data in a manner that permits the interactive content data files to be associated with certain information, such as one or more subject identifications and content metadata. Storing to a relational database further facilitates expedient sorting of the data, such as retrieving interactive content data having time and date data (called "sequencing data") within a predefined range of dates.

The interactive content data can be associated with one or more categories of content metadata and stored as content data files to an Interaction Database on the provider system. Content metadata can include, for example: (i) sequencing data representing the date and time when the interactive content data was created or otherwise representing an order or sequence in which a shared experience reflected in the interactive content data occurred relative to other shared experiences; (ii) subject identification data that characterizes the subjects or topics addressed within the interactive content data (e.g., "technical support" or "new product launch demonstration"); (iii) interaction driver identification data, which can be a subset or subcategory of subject identification data, and that identifies the reasons why a shared experience was initiated (i.e., the reason a customer initiated the interaction can be, and typically is, a subject or topic addressed within the interactive content data); (iv) weighting data representing the relative importance of subject identifications through, for example, an analysis of the frequency of communication elements contributing to the subject identification; (v) content source identification data that identifies one or more participants to the interaction, which can include a name, an affiliated employer or business, or a job title or role and can further comprise agent identification data or user identification data that identifies an agent or customer by name or identification number; (vi) provider identification data that identifies owner of the interactive content data; (vii) user source data, such as a telephone number, email address, or user device IP Address; (viii) sentiment data, including sentiment identifications; (ix) polarity data indicating the relative positive or negative degree of sentiment occurring during a shared experience; (x) resolution data indicating whether a particular user issue was resolved or not, and if so, how the issue was resolved (e.g., the issue is a user forgot a password, and the resolution was a password reset); (xi) an agent identification indicating the provider agent that participated in the shared experience; or (xii) other types of data useful for provider service to a user or processing interactive content data.

Provider-user interactions generally commence when a user contacts a provider through an incoming interaction request. The incoming interaction request includes incoming interaction initialization data, which can be multi-frequency signal tones or data packets representing a user device IP address, email address, or digital routing information. The provider system includes a source identification software service that processes the incoming interaction initialization data to generate user source data, such as a telephone number, a user device Internet Protocol ("IP") Address, an email address, or a social media or other account name.

The source identification software service determines the telephone number of the incoming call source as incoming telephone number data using techniques that can include, for example, automatic number identification ("ANI"). In that case, the incoming interaction initialization data can be ANI data, which is generally transmitted along with an incoming telephone call using multi-frequency signaling, which can be a digital tone that is translated to a numeric value. For Voice-over-Internet Protocol ("VoIP") calling, the incoming telephone number can instead be received as packets of digital information within the incoming interaction initialization data. The source identification software service processes the incoming interaction initialization data (i.e., the ANI data or IP data packets) to determine the source data as incoming telephone number data. The provider system uses the incoming telephone number data to query an internal End User Database to determine whether the incoming telephone number corresponds to an existing provider customer.

When a user initiates a provider-user interaction by communicating with a provider through written electronic communications or VoIP, the communications originate from a user computing device, such as a personal computer, a smart phone, or tablet computing device. In that instance, the source identification software service processes the incoming initialization data to capture or determine user source data that can include a user device IP address for the user computing device, an email address, or a social media or other account name.

The provider system utilizes the user source data to transmit a query to the provider's internal End User Database to determine if an existing database record matches user source data. In this manner, either the incoming telephone number, the user device IP address, email address, or other user source data is used to determine to identity of the end user and whether the user is a current or former provider customer.

The End User Database comprises database records that correspond to individual customers, or end users. The end user database records store a variety of end user data, including, without limitation: (i) a user identification; (ii) user contact data, including a mailing address or a geographic region where the user resides (e.g., a zip code, city, state); (iii) user source data, such as user telephone number data, user device IP Address data, an email address, or a social media account name; (iv) user demographic data, including the gender and age of a user; (v) one or more product identifications that indicate the accounts or products currently held by a user (e.g., a checking account, a home loan, brokerage account, etc.); (vi) user resource availability data (e.g., balances for various product types or account types associated with, or held by, a user); (vii) average resource availability data that indicates the average value of products or account balances maintained by the user over a given time period (e.g., an average monthly balance for an account held by the user); (viii) transaction data that includes data and information relating to user transactions, such as payment amounts, dates when a transaction occurred, data that identifies other parties to the transaction (i.e., a payment recipient), and information identifying a category of expenditures for the transaction (i.e., groceries, transportation, etc.); (ix) average resource utilization volume data indicating the average number of transactions a user conducts using a given product over a given time period (e.g., the number of resource expenditures per month for a given account or accounts); (x) user online activity data indicating user attempts to log into the provider system to access user accounts or other activities performed by users online or through a dedicated mobile device software application; or (xi) system configuration data, as described below.

The End User Database can also include interaction activity data that in part overlaps with data stored to the Interaction Database. That is, the interaction activity data represents information characterizing prior shared experiences between the particular user and the provider, such as a history of user calls to a provider seeking technical support assistance. In particular, the interaction activity data can include, without limitation: (i) sequencing data; (ii) subject identification data; (iii) interaction driver identification data; (iv) sentiment data; (v) polarity data; (vi) user source data (e.g., did the user utilize a telephone, email, or other means to initiate the interaction); (vii) an agent identification; and (viii) resolution data.

The provider system can further determine geographic location data based on the incoming telephone number data or user device IP address. The provider system can include a software application that transmits the incoming telephone number data or the user device IP address to an Identity & Location API that utilizes the phone number or IP Address to determine the approximate geographic location of the user computing device. The Identity & Location API can pass the incoming telephone number or user device IP address to a database or a third-party software service that returns geographic location data corresponding to an approximate geographic location for the telephone number or the user device IP address, such as a city, county, or state. The Identity & Location API stores the geographic data to a database record with the content data.

When users access a provider system through a user computing device, the provider system can capture additional elements of end user data. That is, end user data is captured when a user computing device is used to access the provider system to request data to be displayed on the user computing device. User computing devices access the provider system using an Internet browser software application to access the web server to display a provider webpage. Alternatively, user computing devices access the provider system through a provider mobile software application that displays GUI screens.

In accessing the provider system, the user computing device transmits a user interface transmit command to the web server that can include: (i) the device IP address for the user computing device; (ii) navigation data; and (iii) system configuration data. In response to the user interface transmit command, the web server returns provider display data and a digital cookie that is stored to the user computing device and used to track functions and activities performed by the user computing device. After receiving provider display data, the user computing device processes the display data and renders GUI screens presented to users, such as a provider website or a GUI within a provider mobile software application. Note that in some embodiments, the navigation data and system configuration data may be sent to the provider system in a separate message subsequent to the user interface transmit command message.

Navigation data transmitted by the user computing device generally includes information relating to prior functions and activities performed by the user computing device. Examples of navigation data include: (i) navigation history data (i.e., identifiers like website names and IP addresses showing websites previously access by the user computing device); (ii) redirect data (i.e., data indicating whether the user computing device selected a third-party universal resource locator ("URL") link that redirected to the provider web server); and (iii) search history data (e.g., data showing keyword searches in a search engine, like Google® or Bing®, performed by the user computing device).

Navigation history data allows a provider to determine whether a user computing device was previously used to visit particular websites, including the provider's own website. The navigation history data further indicates whether the user computing device accesses relevant third-party websites, such as websites that contain information concerning a particular product or service or websites that provide technical and other information relevant to resolving a problem experienced by a user. The navigation history data includes, without limitation: (i) URL data identifying a hyperlink link to the website; (ii) website identification data, such as a title of a visited website; (iii) website IP address data indicating an IP address for a web server associated with a visited website; and (iv) time stamp data indicating the date and time when a website was accessed.

Search history data is generated when a user computing device runs a query within a search engine. The search history data can include, without limitation: (i) a search engine identifier indicating the search engine that was utilized; (ii) search parameter data indicating the alphanumeric strings or operators used as part of a search query (e.g., Boolean operators such as "AND" or "OR" or functional operators, like "insite" used to search the contents of a specific website); and (iii) time stamp data indicating the date and time a search was performed.

The user computing device may also transmit system configuration data to the provider system that is used to evaluate a user or authenticate the user computing device. System configuration data can include, without limitation: (i) a unique identifier for the user computing device (e.g., a media access control ("MAC") address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and ascertaining the subject identifications underlying a support request or user communication.

With respect to the agent attribute data, the provider system can include, for example, an Agent Identity Management Service ("Agent IdM") software application that stores and captures a variety of information relating to provider agents. Agent attribute data can include, without limitation: (i) an agent login username, which is a username the agent entered to log into the end user computing device; (ii) an agent identification, such as an employee number or name, that identifies the agent and that is independent of the software applications or computing devices being utilized; (iii) the agent computing device Internet Protocol address ("IP Address"); (iv) agent service line identification data indicating a provider department, branch, or division to which an agent is assigned; (v) an agent role designation (e.g., junior agent, senior agent, supervisor, etc.); (vi) agent location data for the agent computing device indicating, for example, a geographic location where the agent computing device is located or a residential address for the agent; (vii) agent experience data indicating the duration of professional experience an agent has in one or more relevant roles or in working for a provider (e.g., 2 years' experience in new account creation or 5 years and 2 months working for the provider overall); and (viii) agent training data indicating particular certifications, products, or services that an agent is trained to handle (e.g., an agent is qualified to provide technical support for a provider mobile application, or the agent is qualified to offer advice concerning a particular product or service).

Natural Language Processing

Neural Network Architectures and Natural Language Processing

The system processes the interactive content data using natural language processing technology that is implemented by one or more artificial intelligence software applications and systems. The artificial intelligence software and systems are in turn implemented using neural networks. Natural language processing technology analyzes one or more content data files that include alphanumeric textual data composed of individual communication elements, such as words, symbols or numbers. Natural language processing software techniques are implemented as unsupervised learning techniques that identify and characterize hidden structures of unlabeled interactive content data, or supervised techniques that operate on labeled interactive content data and include instructions informing the system which outputs are related to specific input values.

Supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance but only when enough labeled data is available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The system utilizes one or more supervised or unsupervised software processing techniques to perform a subject classification analysis to generate subject data. Suitable software processing techniques for subject classification can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together which then give insights into the subjects of those words and documents. The system can utilize software processing techniques that include Non-Matrix Factorization, Correlated Topic Model ("CTM"), and K-Means or other types of clustering.

Content Data Pre-Processing, Vectorization, and Segmentation

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the system performs vectorization on the reduced content data to map the alphanumeric text into a vector or matrix form. One approach to vectorising content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

In some embodiments, vectorization includes determining a weighted frequency occurrence of all machine encoded communication elements in a corpus of content data. The frequency, or number of occurrences, for each machine encoded communication element is determined. The frequencies of each machine encoded communication element are divided by the highest frequency to generate the weighted frequency occurrence for each machine encoded communication element. The communication elements are then placed into a matrix format.

Vectorization can be better understood with reference to the following simplified example. A corpus of machine encoded communication elements might include the following where each sentence is a row in a matrix: [I, forgot, my, account, password||The, account, is, locked||Please, reset, my, password, and, account]. Each machine encoded communication element can then be replaced by its frequency, such as: [1, 1, 2, 3, 2||1, 3, 1, 1||1, 1, 2, 2, 1, 3]. Here, the highest frequency is three, so each frequency value is divided by 3 to yield: [0.33, 0.33, 0.66, 1, 0.66||0.33, 1, 0.33, 0.33||0.33, 0.33, 0.66, 0.66, 0.33, 1].

In other examples, the vectorization creates a "sparse matrix" where each sentence, or row of the matrix, includes a frequency value for all distinct machine encoded communication elements within the corpus of content data. Where a communication element does not appear in a sentence, the frequency of the communication element is set to zero. Continuing with the foregoing example, the distinct communication elements include [I, forgot, my, account, password, the, is, locked, please, reset, and]. Each sentence is represented as follows: [1, 1, 1, 1, 1, 0, 0, 0, 0, 0, 0||0, 0, 0, 1, 0, 1, 1, 1, 0, 0, 0||1, 1, 2, 2, 1, 3||0, 1, 1, 1, 0, 0, 0, 1, 1, 1].

Techniques to encode the context of words, or machine encoded communication elements, determine how often machine encoded communication elements appear together. Determining the adjacent pairing of machine encoded communication elements can be achieved by creating a co-occurrence matrix with the value of each member of the matrix counting how often one machine encoded communication element coincides with another, either just before or just after it. That is, the words or machine encoded communication elements form the row and column labels of a matrix, and a numeric value appears in matrix elements that correspond to a row and column label for communication elements that appear adjacent in the content data.

As an alternative to counting communication elements (i.e., words) in a corpus of content data and turning it into a co-occurrence matrix, another software processing technique is to use a communication element in the content data corpus to predict the next communication element. Looking through a corpus, counts are generated for adjacent communication elements, and the counts are converted from frequencies into probabilities (i.e., using n-gram predictions with Kneser-Nay smoothing) using a simple neural network. Suitable neural network architectures for such purpose include a skip-gram architecture. The neural network is trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a Uniform Manifold Approximation and Projection algorithm ("UMAP") can be applied to reduce dimensionality while maintaining essential information.

Prior to conducting a subject analysis, the system can further perform segmentation of the content data. A segment analysis segments or divides a content data into logical sections or components. The segmentation can be based on structure of the content data, such as lines between text, segment titles and headings, line breaks, indentations, or combinations of such features. In one embodiment, the segments are identified using a categorizer that can be, for example, a probabilistic latent semantic analysis ("PLSA") model trained on a set of segment categories, such as identifying chapters, headings, subheadings, paragraphs, lines of text, or individual words. In one embodiment the categorizer is trained to detect the beginning of each section, for example, by classifying each group of machine encoded communication elements or lines as being a segment identification or not (i.e., words or symbols denoting a segment of the content data).

Two techniques for segmentation include geometric segmentation and logical segmentation. According to geometric segmentation, an interactive content data file is split into text and non-text based on its geometric structure. Geometric segmentation can be used to identify encoded components that use shapes, symbols, and the like, such as images, symbols, logos, or the like within content data that might be used to denote various headings, subheadings, or sections. A logical segmentation is based on its logical labels such as "call start," "call stop," "opening," "resolution," or other logical components of the content data that represents a shared experience between an user and a provider agent. Logical segmentation is a process of splitting digital text into words, sentences, paragraphs, topics or meaningful sections.

Identifying the structure of content data can rely on an analysis of font sizes or machine encoded communication element positioning. In one example embodiment content data parameters such as character size and spacing between characters, or words and lines are used to represent document physical layout.

In one embodiment, the system relies neural networks trained with annotated data that identify divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard machine encoded communication element characters. The segment data identifications may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from an interactive content data file based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals.

In addition to segmenting the interactive content data file into logical sections or components, the system can extract content data by grouping machine encoded characters into words or groups of words that comprise the content data. To illustrate with a simplified example, the system processes an interactive content data file using a content recognition analysis to identify the individual machine encoded characters, such as a series of characters "P," "a," "t," "r," "i," "c." and "k." The machine encoded characters are grouped into words and groups of words are identified as one or more clusters. Thus, the string of machine encoded characters above is recognized as a name "Patrick." The name Patrick is identified as a name with semantic and heuristic processing techniques and grouped with additional words to identify a full cluster, such as the individual name "Patrick Smith" or the business name "Patrick Family Restaurants."

Grouping machine encoded characters into words can be performed using natural language processing technology alone or in combination with segmentation software processing techniques. In one embodiment, grouping machine encoded characters can be performed by an extraction software module that is trained to label words and clusters according to classifications of content data, such as an end user identification, a product identification, or an agent identification, among other categories. The extraction software module can be implemented with a rule-based software technique, with probability models implemented by neural networks, such as Conditional Random Field system, or with combinations of rule-based techniques and neural networks.

Generating words can also be performed by detecting white spaces between machine encoded characters. Morpho-syntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and word extraction can generate map index data that identifies the locations of segments and words within content data representing a shared experience. For example, each machine encoded communication element (including spaces between words) can be indexed in a sequence using a time code of when a communication element was generated during a provider-customer interaction.

Subject Identification and Content Data Concentration

Prior to conducting a subject analysis to ascertain subject identifications in the content data (i.e., topics or subjects addressed in the content data) or interaction driver identifications in the content data (i.e., reasons why the customer initiated the interaction with the provider, such as the reason underlying a support request), the system can perform a concentration analysis on the content data. The concentration analysis concentrates, or increases the density of, the content data by identifying and retaining communication elements having significant weight in the subject analysis and discarding or ignoring communication elements having relativity little weight.

The content analysis can alternatively be referred to as "extraction" insofar as the analysis can, in some embodiments, entail extracting words or sentences having a weight (i.e., importance) above or below a specified threshold. The extraction thus identifies and stores content data elements having the most importance so the content data is preserved and used for further processing. Put another way, the concentration analysis can remove words, sentences, paragraphs, or segment having the least importance leaving content data of higher "concentrated" importance. Or alternatively, content data having the highest importance can be extracted and stored in a separate file.

The system can perform the concentration analysis according to various categories. For instance, the content data file can be associated with an agent identification or end user identification data. In that case, content data associated with the agent identification (i.e., content data generated from the agent communications) can be concentrated separately from the content data generated by the end user communications. The result is that the agent or end user sentences or words carrying the most importance or weight are preserved for analysis.

The concentration analysis improves the efficiency and accuracy of a subsequent subject classification analysis, sentiment analysis, polarity analysis, or comparison by filtering out and excluding communication elements (e.g., words, phrases, symbols, or numerical values) that do not appreciably contribute to the subjects, interaction drivers, sentiment identifications, or polarity reflected in the content data. The concentration analysis helps to ensure that certain communication elements of limited or no relevance do not factor into the subject or sentiment analyses, thereby changing the results in a manner that leads to inaccuracies. The concentration analysis also enhanced, or densifies, the results that are obtained.

To illustrate, a user can initiate a support request to report that the user intends to travel and to thus request that the provider authorize transactions outside of the user's normal geographic area. In that case, words relating to geographic locations or travel might appear frequently in the content data and represent, for instance, five percent (5%) of the communication elements in the content data. But after removing communication elements as a result of the concentration analysis, the frequency of words relating to location or travel might increase to eight percent (8%) of all communication elements in the content data. In this manner, the frequency, or relative importance, of certain communication elements is enhanced as lending support to the results of the subject classification, sentiment, polarity, and routing analyses.

In one embodiment, the concentration analysis includes executing a frequency-inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The tf-idf is represented by a statistical value that increases proportionally to the number of times a word appears in the content data. This frequency is offset by the number of separate content data instances that contain the word, which adjusts for the fact that some words appear more frequently in general across multiple content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight.

In another embodiment, the concentration analysis determines the sum of frequencies or the weighted frequency occurrence values for each row of a matrix representing content data. Referring to the example above relating to a password reset, the frequency value for each matrix row (corresponding to a sentence) is: [3||2||3.33]. The sum of the weighted frequencies is taken as a relative importance of each sentence in a corpus of communication elements. To concentrate the communication elements, the last sentence alone or in combination with the first sentence (i.e., the sentences with the highest weights) can be extracted and stored to a database for further processing. In this manner, the content data is concentrated by eliminating one out of the three original matrix rows (sentences) resulting in a 20% to 30% reduction in the data. In other embodiments, the system utilizes a frequency threshold and only extracts and store sentences that have a total frequency value, or total weighted frequency occurrence value, above the threshold.

In other embodiments, the concentration analysis can utilize neural networking techniques to evaluate the relative importance of each sentence in a content data file. The concentration analysis can then extract and store to a database a set number of sentences with the highest importance scores or those sentences having a score above a predetermined threshold. The content data file is subject to a reduction analysis described above as well as other pre-processing techniques, such as Part of Speech tagging.

Next, each sentence in a content data file is converted to a feature vector. Each feature vector comprises a series of numeric values where each of the numeric values represent a quantization of a sentence feature. For example, a tf-idf analysis can be used to determine the communication elements having the highest frequencies in a content data file, such as "password" and "account," if such words occur in the content data at a high frequency. The number of high-frequency communication elements in each sentence is determined and used as a value in the feature vector. The following sentence, for example, would have a first feature value of two (2): "Please reset my account password." Other features could include, without limitation: (i) sentence positioning, such as a sentence being positioned fourth (4th) out of one-hundred (100) sentences within the text data where "4" would be a feature value in the feature vector; (ii) the number of communication elements in a sentence so that longer sentences have a higher feature value (i.e., a sentence of 5 words would have a feature vector value of "5"; (iii) sentence position within a single paragraph; (iv) the number of nouns in a sentence; or (v) the number of numerals or numbers within a sentence.

Each feature vector can be processed by a neural network in which feature vector values for each sentence are multiplied by trained weights for each node in the network. The output of the neural network could be a probability that the sentence relates to the overall subject of the content data file or another quantitative measure of sentence relevance. Suitable neural networks could include, but are not limited to, a Restricted Boltzmann Machine, a convolutional neural network, or a recurrent neural network, as discussed more fully below.

In other embodiments, the concentration analysis can utilize neural networks to generate new groups of communication elements or sentences that summarize a content data file. For example, sequence-to-sequence modelling utilizes two groups of one or more neural networks-a first group of neural networks that implement an encoder and a second group that implements a decoder. Suitable neural networks include a Long-Short-Term Memory network architecture, a recurrent neural network, or a gated recurrent neural network. The encoder reads the entire input sequence of communication elements where at each timestep, one communication is fed into the encoder. The encoder then processes the input at every timestep and captures the contextual information present in the input sequence. The decoder reads the entire input sequence and predicts the next communication element in the sequence given the previous word. The resulting output is a series of communication elements that summarize the input content data.

The concentrated content data is processed using a subject classification analysis to determine subject identifications (i.e., topics) addressed within the content data. The subject classification analysis can specifically identify one or more interaction driver identifications that are the reason why a user initiated a shared experience or support service request. An interaction driver identification can be determined by, for example, first determining the subject identifications having the highest weight quantifiers (e.g., frequencies or probabilities) and comparing such subject identifications against a database of known interaction driver identifications. To illustrate, the subject identifications from a shared experience having the five (5) highest frequencies or probabilities might include "forgot password," "report fraud," "the weather," "children," and "sports." The provider system compares the top five subject identifications against a list of known interaction driver identifications that includes "forgot password" and "report fraud" as a known support driver but not "weather," "children," and "sports." In that instance, the provider system identifications the two support drivers as being "forgot password" and "report fraud."

In one embodiment, the subject classification analysis is performed on the content data using a Latent Dirichlet Allocation analysis to identify subject data that includes one or more subject identifications (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The system can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used).

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is, thus, turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identification, which is taken as subject weighting data. A similar analysis can be performed on vectors created through other processing, such as K-means clustering or techniques that generate vectors where each word in the vector is replaced with a probability that the word represents a subject identification or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifications may be substantially different, with some subjects having orders of magnitude fewer subject vectors than others. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content data can be visualized and subject to a reduction into two dimensional data using a Uniform Manifold Approximation and Projection algorithm ("UMAP") to generate a cluster graph visualizing a plurality of clusters. The system feeds the two dimensional data into a Density Based Spatial Clustering of Applications with Noise algorithm ("DBSCAN") and identify a center of each cluster of the plurality of clusters. The process may, using the two dimensional data from the UMAP and the center of each cluster from the DBSCAN, apply a K-Nearest neighbor algorithm ("KNN") to identify data points closest to the center of each cluster and shade each of the data points to graphically identify each cluster of the plurality of clusters. The processor may illustrate a graph on the display representative of the data points shaded following application of the KNN.

The system service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The system can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The system can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the system to identify various content sources within the content data. NER techniques are utilized to classify a given word into a category, such as a person, product, organization, or location. Using POS and NER techniques to process the content data allow the system to identify particular words and text as a noun and as representing a person participating in the discussion (i.e., a content source).

Sentiment Analysis and Relatedness

The system service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Polarity-type sentiment analysis (i.e., a polarity analysis) can apply a rule-based software approach that relies on lexicons, or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identification. The polarity identification can correlate to a polarity score or polarity score range according to settings predetermined by an enterprise. For instance, a polarity score of +5 to +9 may correlate to a polarity identification of "positive," and a polarity score of +10 or higher correlates to a polarity identification of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlatives to a "somewhat negative" polarity indicator. Similarly, the sentence "I lost my debit card, but the agent was great and got me a new card fast" might be scored as plus five (+5) reflecting a positive sentiment with a positive polarity score and polarity identification.

The system can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, size (e.g., big or little, long or short), action (e.g., a verb or noun), etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set content data that comprise sample words, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

In some embodiments, the system can determine relationships between and among subject identifications and sentiment identifications. Determining relationships among identifications can be accomplished through techniques, such as determining how often two identification terms appear within a certain number of words of each other in a set of content data packets. The higher the frequency of such appearances, the more closely the identifications would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Content Data Comparisons

The system evaluates an quantifies equivalence of content data, such as comparing one content file representing a first shared experience against a second content data file representing a second share experience. The system, thus, evaluates the equivalence of two shared experiences by comparing the language used (i.e., content data) during the shared experiences. Software analysis techniques for evaluating equivalence, include, without limitation, Recall Oriented Understudy for Gisting Evaluation ("Rouge") and Bilingual Evaluation Understudy ("Bleu").

Both Rouge and Bleu software analysis techniques utilize n-gram co-occurrence statistic ranging from 0 to 1. A metric value of "1" denotes that content data is exactly the same, and a metric value of "0" denotes there are no similarities in the content data. The software analysis techniques compare reference content data (called "R" for illustration purposes) against a candidate set of content data (called "C" for illustration purposes).

The "Rouge-N" technique determines the number of matching n-grams (i.e., groups of words) between two instances of content data, such as comparing two content data files, two sentences, or another component of segmented content data. Rouge techniques determine metrics that include precision, recall, and a F−1 score of matching n-grams.

Rouge techniques are illustrated with the following simplified examples using a R content data set of "I forgot my password" and a C content data set of "I cannot remember my password." The R content data set includes four words, or n-grams, which can also be called 1-grams or unigrams. The C content data set has five words, or unigrams. The content data sets share three unigrams in common—"I," "password," and "my."

The Rouge-1 precision is computed as the ratio of the number of unigrams in the C content data set that also appear in the R content data set divided by the number of unigrams in the C content data set, which here is ⅗ or 0.6. The Rouge-1 recall is computed similarly, but the number of common unigrams is divided by the number of unigrams in the R content data set, which here is ¾ or 0.75. The Rouge F-1 metric is computed using the standard F1-score formula: F1-score=2*(precision*recall)/(precision+recall).

The Rouge-2 metrics are computed in a similar fashion using groups of two adjacent words. Here, the two content data sets have in common only the 2-gram "my password." The R content data set has three 2-grams: "I forgot," "forgot my," and "my password." The recall would thus be ⅓, or 0.333. Other Rouge software analysis techniques can include Rouge-L comparing the longest common, non-consecutive n-gram sequence between two content data sets and Rouge-S measuring non-consecutive, n-gram sequences. For the Rough-L computation, the longest non-consecutive common sequence in the two content data sets above would be "I my password." For the Rouge-S computation, the sequence "I my" would also count as a 2-gram even though it is a nonconsecutive sequence. The precision, recall, and F1 score are calculated in a similar fashion as described above for the Rouge-N techniques.

Bleu software analysis techniques are determined in a similar fashion except that Bleu techniques focus on computing precision by using the number of n-grams in a "candidate" content data set as the denominator in the metric computations. Those of skill in the art will recognizes that the above techniques are non-limiting examples, and other suitable techniques can be used.

In other embodiments, content data is compared using various natural language processing techniques discussed above. For instance, the system can determine feature vectors for the content data files that compute attributes, such the number of paragraphs, sentences, words, headings, segments, the presence of particular pronouns, among other features. Features vectors for two content data files are compared to determine a measure of equivalence. Additional examples can include, without limitation comparing a sentiment and/or sentiment polarity for two content data files or comparing subject identification vectors between two content data files to detect similarities in subject identifications.

In yet other embodiments, data associated with the content data is compared, such as agent attribute data or end user data. That is, a content data file can be associated with an agent identification, an end user identification, end user geolocation data, or product identification data. Content data files involving the same agent, end user, product, geolocation, and the like are more likely to be considered similar when compared.

The Rouge analysis technique metrics, Bleu analysis technique metrics, feature vector values, sentiment identifications or polarity data, end user data, and agent data can be process by a neural network using predictive analysis software processing techniques to determine a probability that two content data files are similar. The various data elements are associated with weights and processed by nodes within the neural network to determine a probability that two content data files are related. For example, an analysis of training data might reveal that two shared experiences involving the same end user or involving end users from the same geographic location are more likely to be related. In that case, increased weights are attributed to the end user identification data or end user geolocation data in the neural network analysis.

Artificial intelligence technology as implemented by various neural network architectures is discussed in more detail below.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (e.g., DBSCAN), mean shift clustering, expectation maximization (e.g., EM) clustering using Gaussian mixture models (e.g., GMM), agglomerative hierarchical clustering, or the like. In one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Figure 2A:
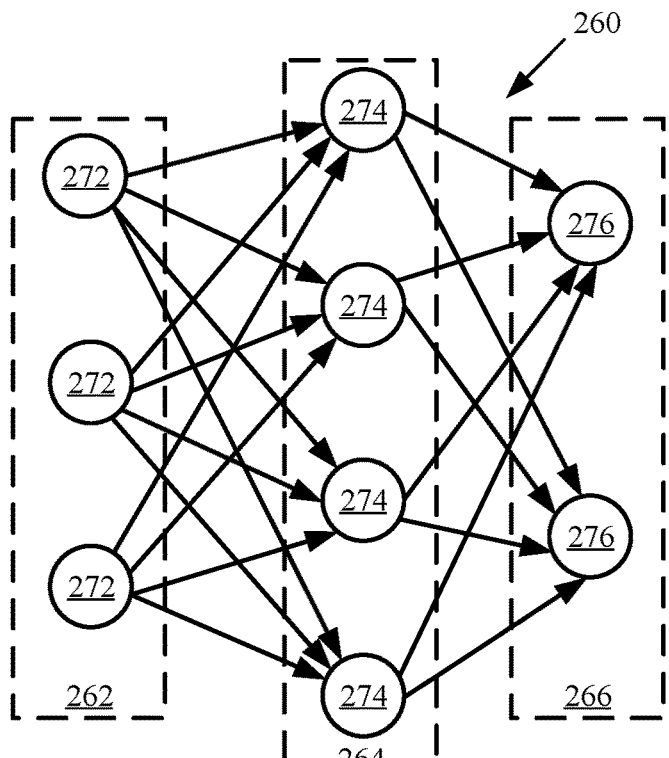
FIG. 2A is a diagram of a feedforward network, according to at least one embodiment, utilized in machine learning.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2C:
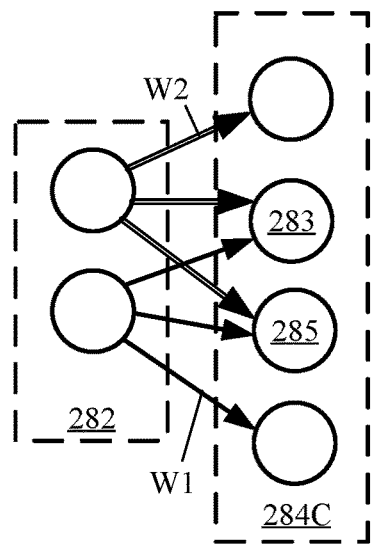
FIG. 2C is a diagram of a portion of the convolution neural network of FIG. 2B, according to at least one embodiment, illustrating assigned weights at connections or neurons.
Figure 2B:
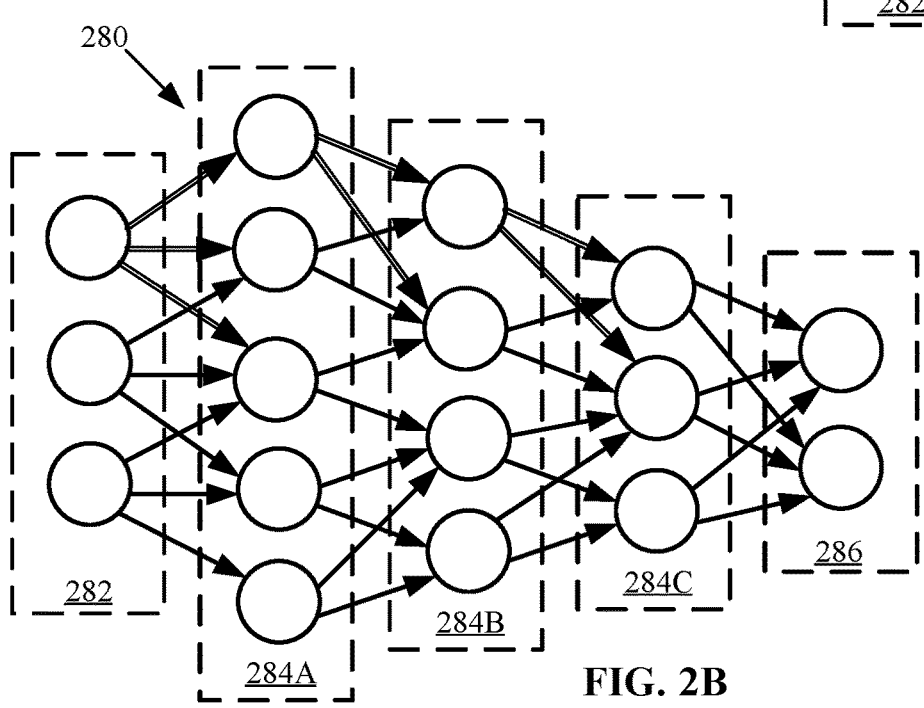
FIG. 2B is a diagram of a convolution neural network, according to at least one embodiment, utilized in machine learning.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
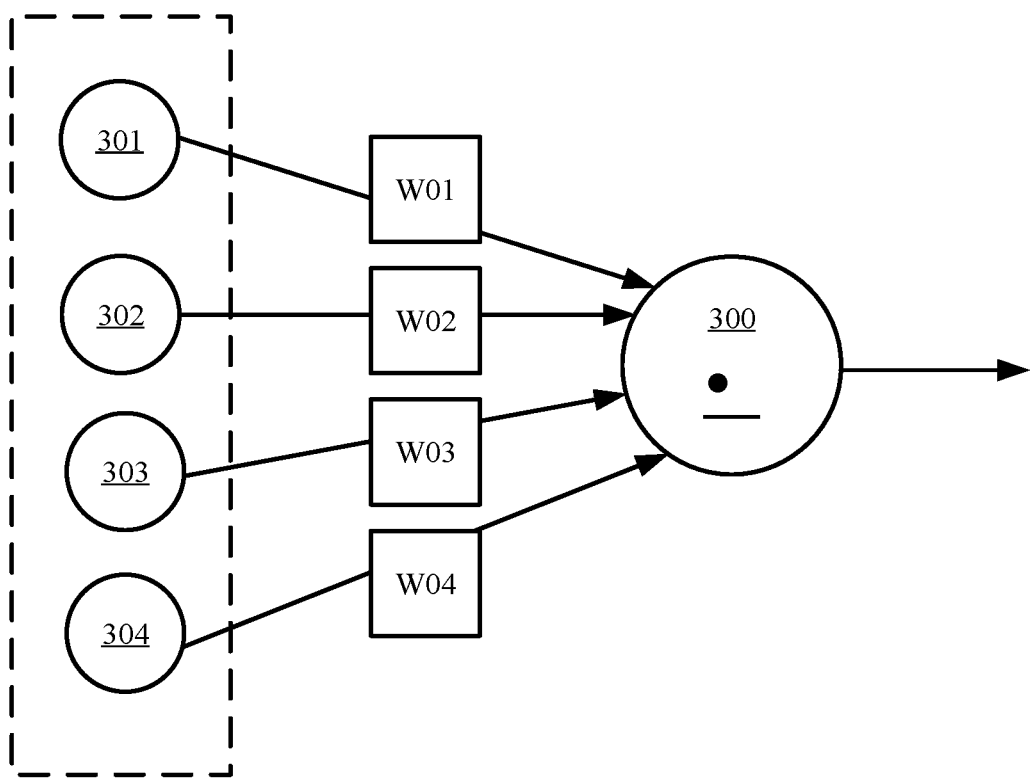
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight $W01$, $W02$, $W03$, and $W04$ in the computation at the node 300, which in this example is a weighted sum.

An additional type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
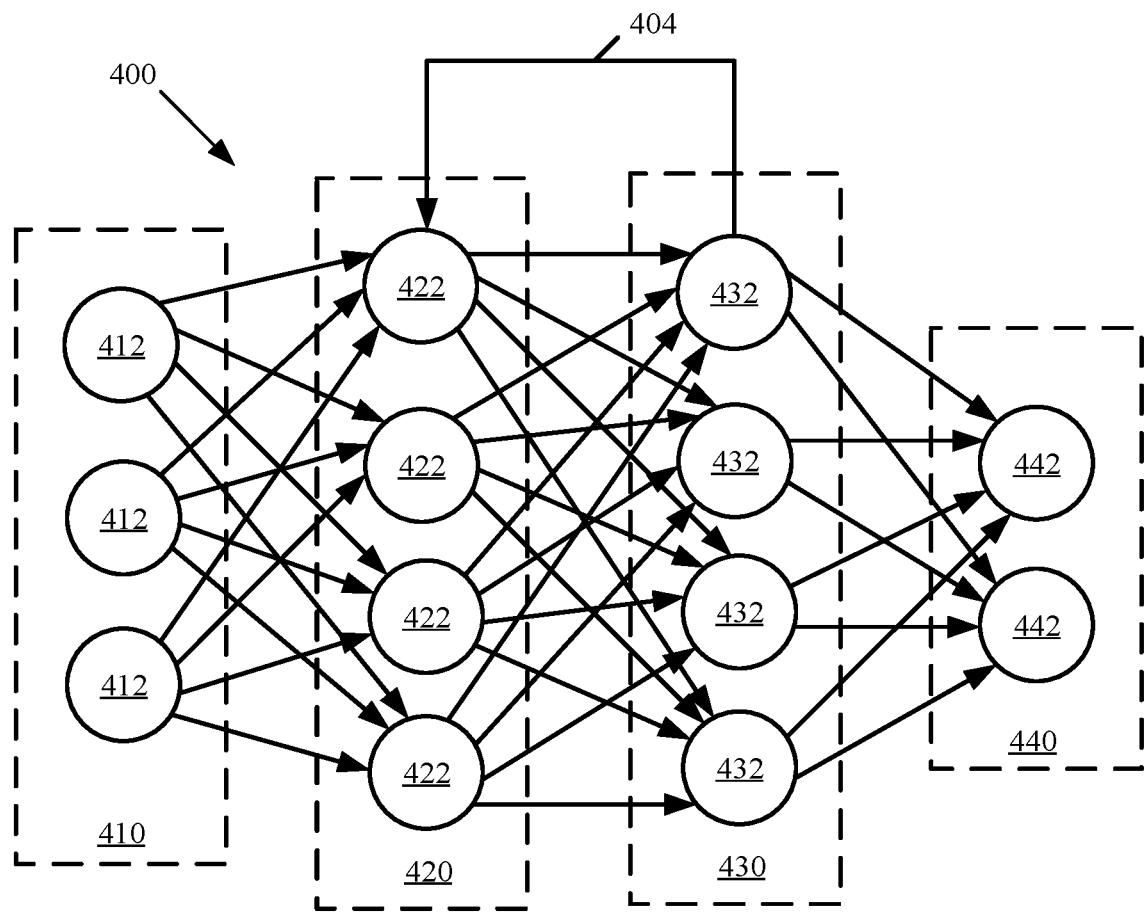
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
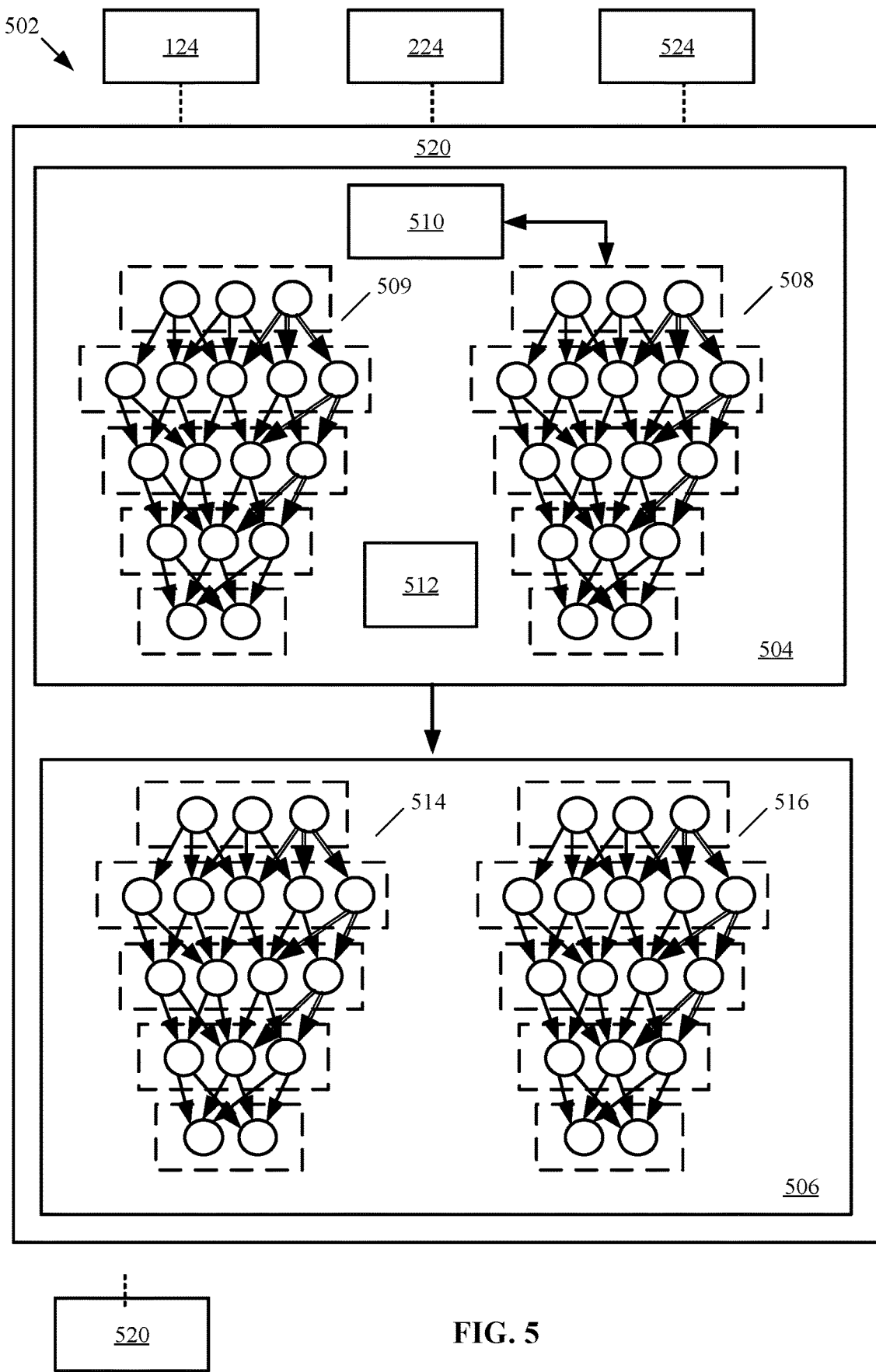
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation, such as natural language processing).

For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on K-means clustering software processing techniques.

Figure 6:
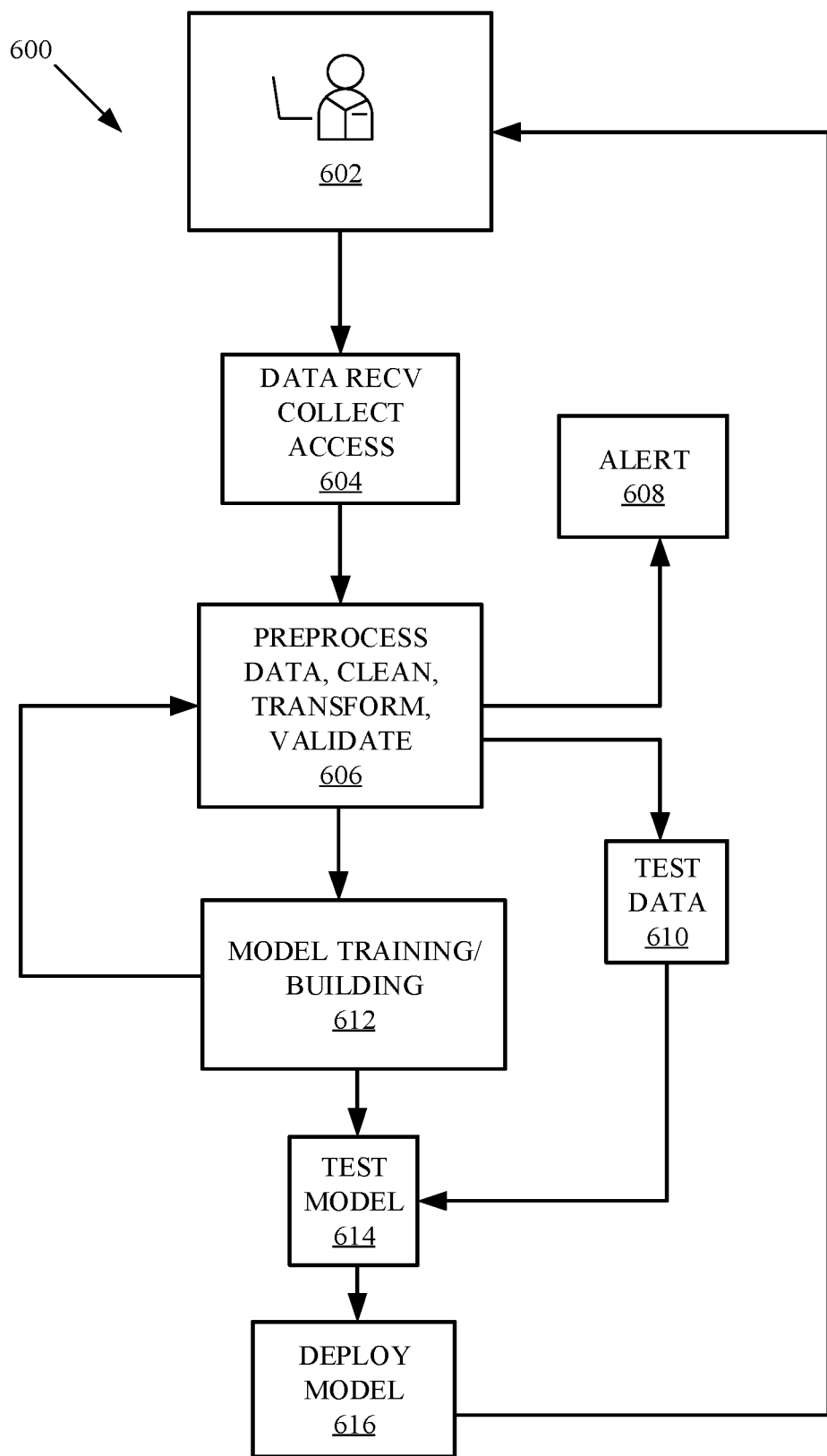
FIG. 6 is a flow chart representing a method model development and deployment by machine learning.

Turning to FIG. 6, a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation to confirm that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Content Data Processing and Examples

System Applications

Figure 7:
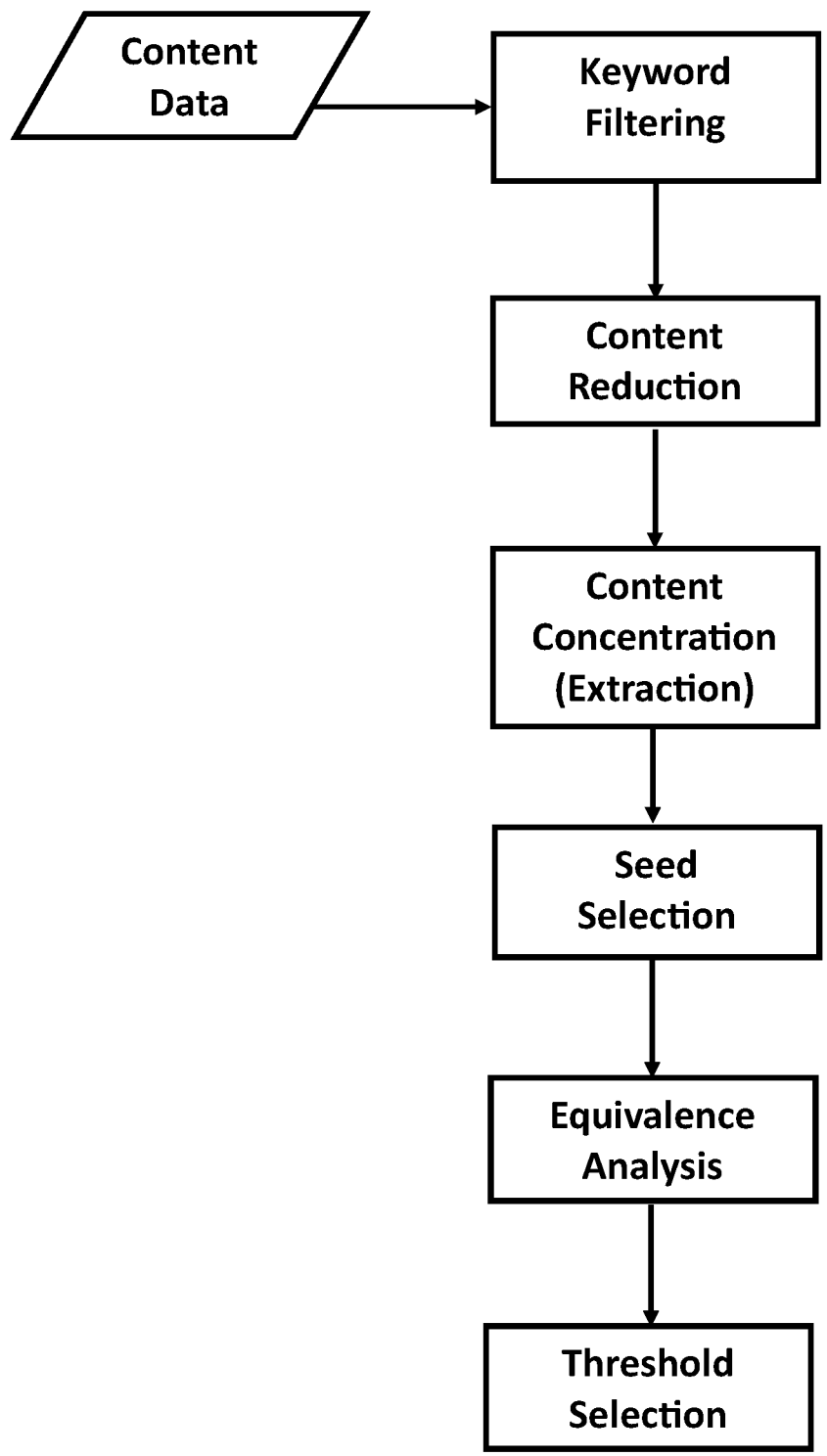
FIG. 7 is a flow chart representing a method for content analysis according to one embodiment.

A processes for determining interactive content data equivalence is shown in FIG. 7. The system automatically and efficiently processes enormous volumes of interactive content data to determine which among thousands of shared experiences and the underlying content data files are similar. The provider system processes interactive content data that can be a transcription of a discussion between an end user and a provider or an exchange of written communications, such as emails or instant "chat" message. The interactive content data is stored to a database on the provider system or to a remote storage location. The interactive content data is stored as content data files that include the substance of an exchange of communications along with content metadata.

The system is first trained through a process that includes manually reviewing the interactive content data to determine a seed set of content data files that relate to particular subject identifications or that share particular attributes. The seed set of content data files is compared against a much larger corpus of data to determine a equivalence value threshold. The provider verifies that the equivalence value threshold is acceptable by determining that content data files having a equivalence value above the threshold likely relate to the same subject identification as the seed set of content data files. The process is automated so that the system analyzes thousands of interactive content data files to identify those interactive content data files having a equivalence value above the equivalence value threshold.

As an example, the seed set of interactive content data files might relate to shared experiences where end users seek assistance in making an electronic transfer of funds. A corpus of content data files is analyzed and compared against the seed set of content data files to determine which of the corpus of content data files relate to the same subject identification—i.e., making an electronic transfer of funds. As another example, a provider can create a seed set of content data files that represent shared experiences that were successful, such as a provider agent that achieved a positive sentiment after guiding an end user through obtaining a new microchip card after an instance of theft. The provider then compares a corpus of content data files against the seed set to identify content data files representing successful shared experiences that can be used for training or to reward high performing agents.

Conventional systems rely on provider personnel to manually review content data files by, for example, listening to recordings of voice calls or reading transcripts of email or instant message communications. The content data files are manually reviewed to determine a set of content data files relating to a given subject identification. Alternatively, provider agents input one or more subject identifications following a shared experience, such as selecting from among a predetermine list of subject identifications or other attributes (e.g., customer sentiment, product identification, etc.) that are displayed on a pull-down menu or other input.

Conventional systems suffer drawbacks that include the use of time intensive and subjective manually reviews that consume substantial provider resources and that might not be consistent across manual reviewers. Moreover, selecting subject identifications and other attributes among a pre-defined list is by definition limited in the number of options and, therefore, the pre-defined options might not include subject identifications that are new or less common, or the pre-defined options might not accurately characterize the subject identifications of a shared experience. Requiring manual inputs is also time consuming where a provider handles thousands of end user interactions during the course of a year.

To illustrate drawbacks of conventional systems, a provider may observe interaction drivers such as "chip debit card failure" that were not previously common but that started recently occurring after a provider received a defective shipment of microchip cards. In that case, the pre-determined list of subject identifications might not contain any options indicating "microchip card failure." Or the predetermined list might include only general options stating "card problem" that do not give the provider real-time insights into the precise nature of the problems experienced by users. The selection of subject identifications might also depend on subjective interpretation of provider personnel in selecting between two potentially applicable interaction drivers, such as "payment problem" or "device failure."

By contrast, the present systems rely on sophisticated artificial intelligence and NPL technology that do not require resource-intensive manual review, that do not require provider agents to take time to categorize or describe a shared experience after it ends. The system automatically processes content data in near real time so that a provider can identify trends in recent shared experiences. Providers can expediently identify problems as well as develop and deploy solutions in part through recognizing trends as they occur. Moreover, the system captures and analyzes information automatically and does not depend on provider agents or other personnel to take the time to select an input option.

To illustrate the utility of real time analysis, content data files can be analyzed as they are generated and compared against multiple seed sets where each seed set relates to subject identifications such as "electronic transfers" or "updating mobile software application." If such subject identifications begin to appear in increasing numbers over the course of a day, the provider system can quickly identify the content data files relating to the given subject identification.

The content data files are analyzed to identify potential problems with the provider's system, such as the system failing to display transfer confirmation notices when an electronic transfer is complete. The system can be fixed to display the desired transfer confirmation notices. Or a provider can update or modify its interactive voice response ("IVR") system to address subject identifications that are appearing more frequently. For example, if an end user's mobile software application must be updates to view a product account balance, the provider can modify its IVR system to include instructions for updating the mobile software application or menu options for routing incoming support requests to an agent having training and expertise in the provider's mobile software application.

Those of skill in the art will appreciate the foregoing example applications of the present technology are not intended to be limiting. The system can be used for other applications where natural language processing and artificial intelligence technology can be used to compare two content data files.

System Setup and Operation

A first step in generating a seed set of interactive content data files is determining search terms relating to particular subject identifications or attributes that will comprise the seed set, such as the search term "password" to identify interactive content data files relating to end user support requests to change a password. The search terms can include subject identifications as well as various attributes of the interactive content data files, such as an agent identification, an end user identification, an end user geographic location, a product identification, as well as various other types of agent attribute data or end user data.

The keyword search terms are applied to the corpus of interactive content data files to identify those interactive content data files matching the keyword search terms. The search can be performed using Boolean logic alone or in combination with other searching techniques, such as searching only interactive content data files created after a particular date or requiring that the search terms appear proximal to one another, among other techniques. The results of the search will be a content data file subset.

The content data file subset is processed with a reduction analysis that includes a qualification operation, contradiction operation, tokenization, stop word removal, stemming, hyponymy and hypernym replacement, and lemmatization, among other software processing techniques discussed above. The interactive content data is placed into vector format that considers the frequency of machine encoded content elements (e.g., individual letters or numbers) or communication elements (e.g., groups of machine encoded content elements forming words). In some embodiments, the interactive content data is converted to vector format using predictive techniques that converts counts from frequencies into probabilities using a neural network, such as a skip-gram network architecture. The interactive content data is optionally segmented using feature extraction software processing techniques or using a neutral network that identify segments using a categorizer that can be, for example, a probabilistic latent semantic analysis implemented by neural network.

The provider system also processes the content data file subset by performing the concentration analysis discussed above to yield concentrated interactive content data. The interactive concentrated content data includes machine encoded communication elements, such as words, sentences, and paragraphs, having higher weights corresponding to elevated importance. In some embodiments, the interactive content data is concentrated according to the content data source, such as separately creating concentrated content data for content generated by a provider agent or by an end user.

The concentrated interactive content data is reviewed to identify the seed set of interactive content data files. The number of interactive content data files within the seed set can vary according to provider preferences. Generating a seed set with more concentrated content data files will increase the accuracy of subsequent equivalence analysis but requires increased processing time. In one embodiment the seed set of interactive content data files is generated by manually reviewing video and/or audio files of a recorded shared experience, manually reviewing transcripts of a shared experience that occurred by phone (where speech recognition techniques were used generate alphanumeric text transcripts), or manually reviewing transcripts of shared experiences that occurred via written communication (e.g., emails, text messages, or instant chat messages).

The seed set can be improved by selecting concentrated content data files that have lower noise content, such as concentrated content data files that relate only to a single subject identification or a more specific subject identification. For instance, a content data file might reflect a shared experience where a first end user requested a password reset after experiencing a security breach and subsequently request information about provider security products, such as automated monitoring tools. If a provider desires to generate a seed set of content data files relating to resetting passwords in cases where an end user forgot a password after a long period of non-use, the foregoing shared experience involving the first end user might not be suitable for inclusion in the seed set for multiple reasons.

A first reason is that interactive content data file involving the first end user would include "noise" insofar as multiple subject identifications apply, such as "password reset after security breach" and "new security product request." Further, the subject identification of "password reset after security breach" does not precisely match a subject identification of "password reset after extended non-use" where different provider procedures might apply to resolve distinct issues presented for the two subject identifications. The consequence of the increased noise and variation in subject identifications is that the content data file will include differing communication elements with varying frequencies that would negatively impact a subsequent equivalence analysis if a provider was generating a seed set to identify instances of password resets after periods of non-use.

Following seed selection, individual interactive content data files from a corpus of content data files are compared against each of the concentrated content data files from the seed set to generate equivalence values for each comparison. For example, a seed set might include ten concentrated content data files. A "production" content data file is selected from a larger corpus of content data files having unknown subject identifications. The production content data file is separately compared to each of the concentrated content data files in the seed set to generate ten equivalence values using, for example, the Rouge and Bleu software processing techniques.

To determine a equivalence value threshold that is used to automate the equivalence analysis, the provider first determines equivalence values for multiple content data files by comparing each content data file against each concentrated content data file in the seed set and determining the average equivalence value. Continuing with the prior example, the provider system performs the equivalence analysis using one-hundred (100) production content data files and determines the average equivalence value for each of the one-hundred (100) production content data files. The production content data files are grouped according to average equivalence value ranges, such as production content data files having average equivalence values falling within the ranges 0.5 to 0.6, 0.6 to 0.7, and so on through 0.9 to 1. Those of skill in the art will appreciate that more production content data files can be analyzed when determining a equivalence value threshold, and the production content data files can be grouped into varying equivalence value ranges.

The provider analyzes each of the production content data files to determine if each of the production content data files is, in fact, similar to the seed set and the desired subject identification—i.e., a "true" or "positive" match. In one embodiment, analysis is performed as a manual review of audio data or transcript data for each production content data file. The average equivalence value threshold range that exhibits an acceptable proportion of positive matches is taken as the equivalence value threshold. To illustrate, a provider might determine that: (i) about two-thirds of the production content data files having an average equivalence value between 0.5 and 0.6 are "true" matches to the seed set; and (ii) over eighty-five percent (85%) of the production content data files having an average equivalence value between 0.6 and 0.7 are a "true" match. In that case, the provider can establish 0.7 as the equivalence value threshold if 85% is an acceptable match probability.

The provider can utilize the "elbow" approach to determine the equivalence value threshold. The elbow approach graphs the percentage of true matches (Y-axis) as a function of equivalence values (X-axis). As the plot reaches a horizontal path, the percentage of true matches increases less with increasing equivalence value. The equivalence value threshold can be selected to correspond to the inflection point where the plot begins to level out.

Once an acceptable equivalence value threshold is determined, the system can deploy an automated equivalence analysis that is performed on content data files selected by a provider. As an example, a provider system can be configured to perform a equivalence analysis on each new content data file as it is generated, or the system can perform batched equivalence analyses on groups of content data files generated within the past hour, past day, or that originate from a particular provider location, among other criteria. The system can also run equivalence analyses on command based on inputs from provider agents or personnel, such as a command to perform equivalence analyses on content data files relating to a particular group of provider agents (e.g., all agents within the "tech support" or sales group).

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for automated measurement of interactive content equivalence comprising:
   (a) a computer that includes at least one processor;
   (b) a machine-learning software module and training data, wherein the machine-learning software module causes the processor to perform the operations of:
      (i) iteratively training, using the training data, a neural network to measure co-occurrence;
      (ii) inserting the training data into an iterative training and testing loop to predict a target variable;
      (iii) repeatedly determining, during each iteration of the training and testing loop, the target variable, wherein each iteration of the training and testing loop has differing weights assigned to one or more nodes of the neural network, each of the differing weights being updated with each iteration of the training and testing loop to reduce error in predicting the target variable and improve predictability of the neural network thereby creating a trained neural network; and
      (iv) deploying the trained neural network;
   (c) a memory device storing data and executable code that, when executed, causes the at least one processor to:
      (i) run a search on a production set of interactive content files to determine matching interactive content files that comprise one or more user-specified communication elements, wherein the matching interactive content files are used to create an interactive content file subset;
      (ii) select matching interactive content files within the content file subset having a subject identification that corresponds to a given subject identification, wherein the selected matching interactive content files are stored as a content file seed set;
      (iii) select a plurality of training interactive content files from the production set of interactive content files;
      (iv) convert the training interactive content files and the content file seed set into machine encoded n-grams;
      (v) generate by the trained neural network an equivalence value threshold by measuring co-occurrence between each individual training interactive content file and the content file seed set;
      (vi) deploy automated equivalence detection software that, when executed, causes the processor to:
         (A) activate a digital recorder that records a plurality of interactive voice communication sessions between an agent and an end user and that stores the plurality of interactive voice communication sessions to the memory device as an audio file,
         (B) convert each audio file to a target interactive content file that comprises a transcript of at least part of the interactive voice communication;
         (C) convert the each target interactive content file to a plurality of machine encoded n-grams,
         (D) measure, by the trained neural network, a co-occurrence of the machine encoded n-gram in each of the target interactive content files to n-grams in a seed set of concentrated target interactive content files, wherein the co-occurrence is converted to an equivalence value, and (E) determine if the equivalence value is above a equivalence value threshold, wherein when the equivalence value is above the equivalence value threshold, the target interactive content file is stored to a positive match database;

(vii) monitor a volume of target interactive content files stored to the positive match database to detect whether the volume exceeds a positive match threshold;

(viii) determine the subject identification for each of the interactive content files stored to the positive match database and record the subject identification that appears the most frequently; and (d) an interactive voice response software application configured to output audio data that corresponds to end user selectable options, wherein (i) when the volume of target interactive content files in the positive match database exceeds the positive match threshold, the processor modifies the interactive voice response software application so that the audio data incorporates the subject identification that appears most frequently into one of the user selectable options, (ii) the audio data is transmitted to an end user computing device in response to a phone call from the end user, and (iii) in response to the end user selecting the option incorporating the most frequent subject identification, the phone call is routed to an agent having training and experience that relates to the subject identification.

2. The system for automated measurement of interactive content equivalence of claim 1, wherein the executable code further causes the processor to:

(a) measure a frequency of communication elements within the content file seed set;

(b) extract communication elements from the content file seed set when the communication element frequency is below a frequency threshold; and (c) store the content file seed set as the content file seed set following the extraction.

3. The system for automated measurement of interactive content equivalence of claim 1, wherein the executable code further causes the processor to transmit a notification to the agent computing device when a proportion of the target interactive content files has an equivalence value that exceeds the equivalence value threshold.

4. The system for automated measurement of interactive content equivalence of claim 1, wherein the trained neural network is used to perform the operation of selecting matching interactive content files within the content file subset having a subject identification that corresponds to the given subject identification.

5. The system for automated measurement of interactive content equivalence of claim 4, wherein the neural network performs operations that implement Latent Dirichlet Allocation to determine the subject identification.

6. The system for automated measurement of interactive content equivalence of claim 1, wherein the system comprises a second neural network that implement K-means clustering to perform the operation of selecting matching interactive content files within the content file subset having a subject identification that corresponds to the given subject identification.

7. A system for automated measurement of interactive content equivalence comprising a computer that includes at least one processor and a memory device storing data and executable code that, when executed, causes the at least one processor to:

(a) capture interactive communications that are stored to the memory device as an interactive content file;

(b) convert the interactive communications within the interactive content file into a plurality of machine encoded communication elements;

(c) segment the interactive content file according to communication element groups;

(d) determine a subject identification for the interactive content file;

(e) create a feature vector from the interactive content file, wherein the feature vector comprises the subject identification and size data for each communication element group;

(f) generate a set of seed content files, wherein each seed content file is associated with a benchmark feature vector and the subject identification;

(g) determine an equivalence value for the interactive content file using the feature vector by comparing the feature vector against the benchmark feature vector for each of the seed set content files;

(h) determine if the equivalence value is above a equivalence value threshold, wherein when the equivalence value is above the equivalence value threshold, the interactive content file is stored to a positive match database;

(i) measure a subject frequency for each subject identification within the interactive content files; and (j) select the subject identification with the highest subject frequency; and (k) implement by the processor an enhancement selected from one of (i) modifying an audio output of an interactive voice response software application to incorporate an end user selectable option comprising the subject identification with the highest frequency, wherein (A) the audio output is transmitted to an end user computing device in response to a phone call from the end user, and (B) in response to the end user selecting the option incorporating the subject identification with the highest frequency, the phone call is routed to an agent having training and experience that relates to the subject identification with the highest frequency, or (ii) modifying system resource availability by adding one or more agent computing devices to an enterprise network.

8. The system for automated measurement of interactive content equivalence of claim 7, wherein (a) the system further comprises a machine-learning software module and training data, wherein the machine-learning software module causes the processor to perform the operations of (i) iteratively training, using the training data, a neural network to generate a probability that the feature vector for the interactive content file corresponds to feature vectors for the seed set of content files, (ii) inserting the training data into an iterative training and testing loop to predict a target variable, (iii) repeatedly determining, during each iteration of the training and testing loop, the target variable, wherein each iteration of the training and testing loop has differing weights assigned to one or more nodes of the neural network, each of the differing weights being updated with each iteration of the training and testing loop to reduce error in predicting the target variable and improve predictability of the neural network thereby creating a trained neural network, and (iv) deploying the trained neural network; and (b) the equivalence value is determined by using the trained neural network to generate a probability that the feature vector for the interactive content file corresponds to feature vectors for the seed set of content files.

9. A system for automated measurement of interactive content equivalence comprising:
  (a) a computer that comprises at least one processor, a trained neural network, and a memory device storing data and executable code that, when executed, causes the at least one processor to:
    (i) run a search on a production set of interactive content files to determine matching interactive content files that comprise one or more user-specified communication elements, wherein the matching interactive content files are used to create an interactive content file subset;
    (ii) determine, by the trained neural network, interactive content files within the subset having a subject identification that corresponds to a seed set subject identification and storing the selected interactive content files as seed set content files;
    (iii) capture interactive communications and store the interactive communications to the memory device as an interactive content file;
    (iv) convert the interactive communications to a plurality of machine encoded communication elements;
    (v) determine an equivalence value through a comparison of machine encoded communication elements in the interactive content file to machine encoded communication elements in a seed set of concentrated interactive content files;
    (vi) determine if the equivalence value for each interactive content file is above a equivalence value threshold by measuring co-occurrence between each interactive content file and each seed set content file, wherein when the equivalence value is above the equivalence value threshold, the interactive content file is stored to a positive match database;
    (vi) determine using the trained neural network the subject identification for each of the interactive content files stored to the positive match database;
    (vii) measure a subject frequency for the interactive content files in the positive match database to determine whether the subject frequency for a given subject identification exceeds a positive match threshold; and
  (b) an interactive response software that outputs audio data comprising options for selection by a user on a mobile computing device, wherein when the positive match threshold is exceeded, the processor modifies the audio data to incorporate a new user-selectable option that is (i) output from the mobile computing device and (ii) comprises the given subject identification.

10. The system for automated measurement of interactive content equivalence of claim 9, wherein the executable code further causes the processor to:
  (a) convert the seed set content files into vector form according to weighted frequency occurrence of machine encoded elements within the seed set content files;
  (b) extract machine encoded elements from the seed set content files according to a composite weighted frequency occurrence; and
  (c) store the seed set content files as a seed set of concentrated interactive content files following the extraction.

11. The system for automated measurement of interactive content equivalence of claim 9, wherein the executable code further causes the processor to:
  (a) measure a frequency of communication elements within the seed set content files;
  (b) extract communication elements from the seed set content files when the communication element frequency is below a frequency threshold;
  (c) store the seed set content files as a seed set of concentrated interactive content files following the extraction; and
  (d) perform the operation to determine if the equivalence value for each interactive content file is above the equivalence value threshold by measuring co-occurrence between each concentrated interactive content file within the seed set.

12. The system for automated measurement of interactive content equivalence of claim 9, wherein the executable code further causes the processor to transmit a notification to an agent computer when a proportion of the interactive content files has an equivalence value that exceeds the equivalence value threshold.

13. The system for automated measurement of interactive content equivalence of claim 9, wherein the trained neural network measures the co-occurrence of the machine encoded communication elements between the interactive content file and each of the seed set of concentrated interactive content files.

14. The system for automated measurement of interactive content equivalence of claim 9, wherein:
  (a) the computer comprises a second neural network; and
  (b) the second neural network is used to measure co-occurrence.

* * * * *

UNITED STATES PATENT AND TRADEMARK OFFICE
CERTIFICATE OF CORRECTION

| | | |
|---|---|---|
| PATENT NO. | : 12,326,888 B2 | Page 1 of 1 |
| APPLICATION NO. | : 18/321943 | |
| DATED | : June 10, 2025 | |
| INVENTOR(S) | : Phu Pham, Jun Ji and Merle Hidinger | |

It is certified that error appears in the above-identified patent and that said Letters Patent is hereby corrected as shown below:

In the Claims

Claim 9, Column 45, Line 48 should read --(vii) determine using the trained neural network the--

Claim 9, Column 45, Line 51 should read --(viii) measure a subject frequency for the interactive--

Signed and Sealed this
Twenty-first Day of October, 2025

John A. Squires
*Director of the United States Patent and Trademark Office*